United States Patent [19]

Gardner

[11] 3,847,254
[45] Nov. 12, 1974

[54] PARKING BRAKE
[75] Inventor: Richard H. Gardner, Pleasant Hill, Ohio
[73] Assignee: The B. F. Goodrich Company, New York, N.Y.
[22] Filed: Apr. 2, 1973
[21] Appl. No.: 346,963

[52] U.S. Cl. ............................. 188/70 R, 188/170
[51] Int. Cl. ............................................ F16d 63/00
[58] Field of Search ...... 188/70 R, 70 B, 75, 106 R, 188/106 P, 170

[56] References Cited
UNITED STATES PATENTS
3,051,271  8/1962  Spannagel et al. ............. 188/70 R X
3,122,221  2/1964  Von Rucker ................. 188/70 R X
3,173,515  3/1965  Haddock et al. ..................... 188/75

Primary Examiner—Duane A. Reger
Attorney, Agent, or Firm—John D. Haney; W. A. Shira, Jr.

[57] ABSTRACT

A parking brake for a caliper type disc brake having friction members mounted on swingable arms for braking engagement with the circular edge of the rotatable brake disc. The friction members are moved into braking engagement by mechanical spring means connected to the arms. The friction members are moved out of braking engagement by fluid power means connected to the arms and capable of overcoming the force of the mechanical spring means.

6 Claims, 3 Drawing Figures

PARKING BRAKE

BACKGROUND OF THE INVENTION

This invention relates to a parking brake for a caliper type disc brake in which one or more pairs of friction lining pads are located on opposite sides of a rotatable disc for movement into braking engagement with the disc. One of the problems with a brake of this type which is actuated by air or hydraulic fluid is that it does not meet the safety standard for parking brakes. This standard requires that the parking brake be maintained in braking engagement solely by mechanical means. The additional parking brake apparatus necessary to meet these requirements increases the weight of the brake and creates a space problem because of the limited space available. Furthermore, with a caliper type disc brake of the "fixed head", "fixed disc" type in which the brake head assembly is fixedly mounted on the axle and the disc is fixedly mounted on the wheel, it is a difficult problem to provide a mechanical parking brake apparatus for braking engagement with the outboard side of the rotatable brake disc.

SUMMARY OF THE INVENTION

The parking brake apparatus of this invention has brake shoe and lining assemblies mounted on swingable arms for moving the assemblies into braking engagement with the circular edge surface of the brake disc. A mechanical spring mechanism connected to the arms automatically moves the brake shoe and lining assemblies into braking engagement and holds the arms in this position. The parking brake is released by an air or hydraulic power unit connected to the arms which generates a force greater than the force generated by the mechanical spring mechanism to move the brake shoe and lining assemblies out of engagement with the edge surface of the brake disc. By utilizing the maximum disc radius, a minimum braking force for actuation of the brake is required. Also, the leverage obtained by using the arms and the placing of the brake shoe and lining assemblies to obtain a self-energizing braking force permits a design which provides the maximum braking with a minimum size and weight of the parking brake apparatus. Limited relative movement of the rotatable disc and brake head is possible with this design because it is not essential that the brake disc and the brake shoe be maintained in perfect alignment. The parking brake actuating mechanism is also located in the available space at the opposite side of the wheel from the caliper brake head assembly and accordingly no major design changes are required in the caliper type disc brake apparatus.

The accompanying drawings show one preferred form of the parking brake made in accordance with and embodying this invention and which is representative of how this invention may be practiced.

DETAILED DESCRIPTION

Figure 1:
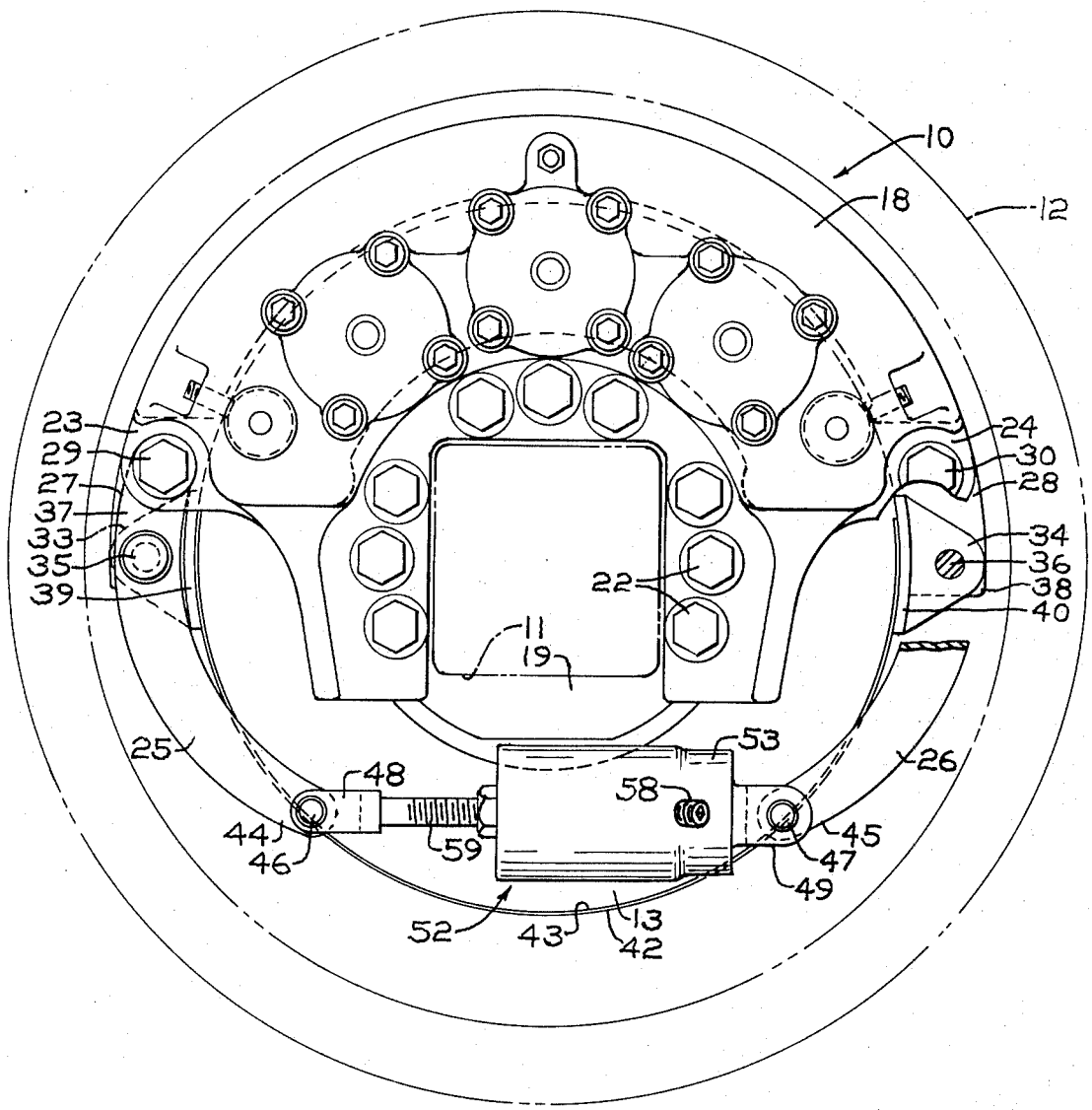
FIG. 1 is an inboard elevation of the caliper type disc brake incorporating the parking brake of this invention with the vehicle axle and wheel being shown in chain-dotted lines.
Figure 2:
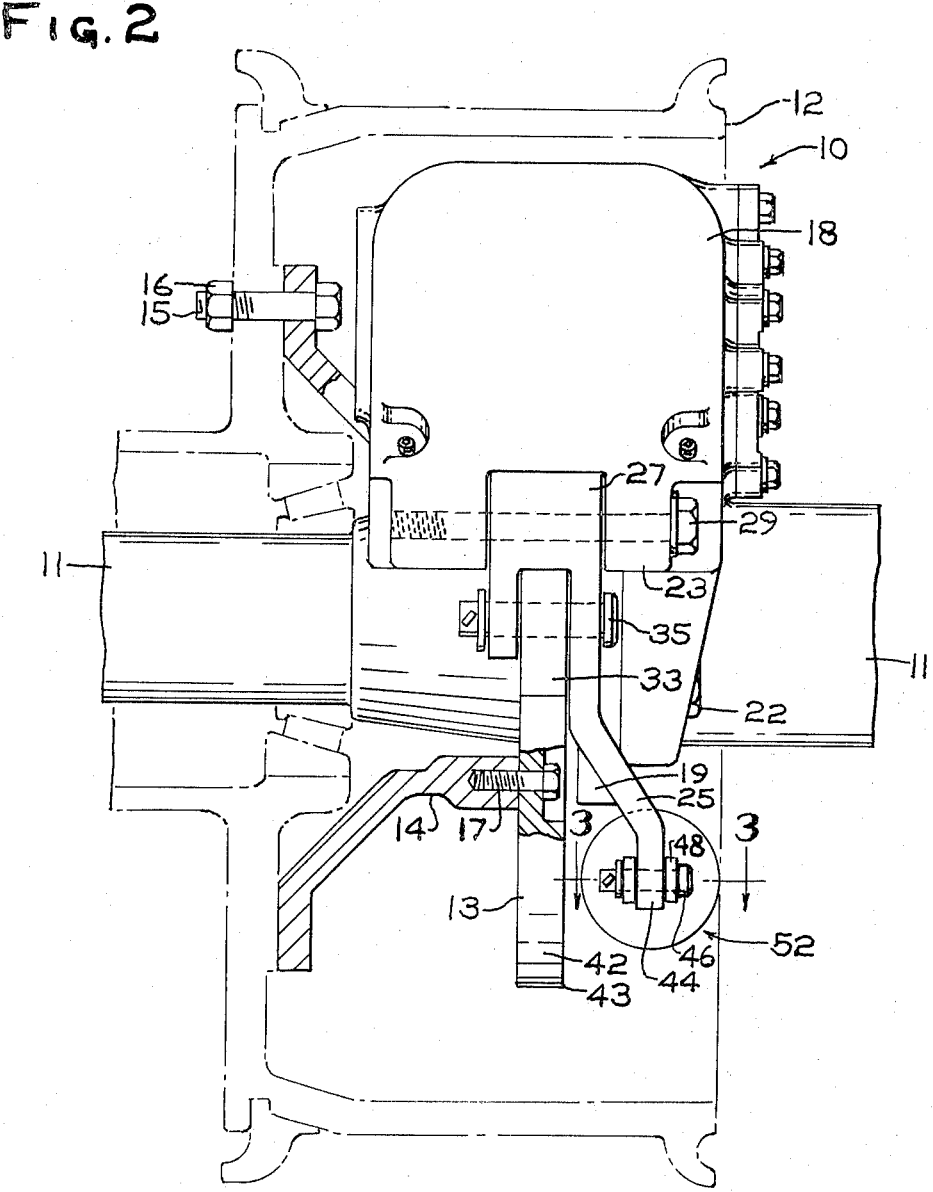
FIG. 2 is a side elevation of the brake shown in FIG. 1 with the wheel being shown in chain-dotted lines and certain parts being broken away and sectioned to illustrate the attachment of the brake disc to the wheel.

A caliper disc brake assembly 10 is shown in FIGS. 1 and 2 mounted on a vehicle axle 11 on which a wheel 12 is rotatably mounted. A rotatable brake disc 13 which may be of steel or other wear-resistant material is fastened to the wheel 12 by a cylindrical flange 14 which may be fastened to the wheel by bolts 15 and nuts 16 spaced around the flange. The flange 14 is fastened to the brake disc 13 by studs 17 threaded in the ends of the flange, as shown in FIG. 2. The brake disc 13 has a central opening through which the axle 11 may extend for supporting the wheel 12. A caliper brake head assembly 18 is mounted on a torque flange 19 of the axle 11 as by bolts 22 to hold the head assembly against rotation. The head assembly 18 contains the caliper brake friction members (not shown) for braking engagement with the brake disc 13 which may be actuated by a fluid medium such as air or hydraulic fluid.

The head assembly 18 has extensions such as lugs 23 and 24 at opposite sides of the disc 13 for pivotal connection to clamping arms 25 and 26. Upper ends 27 and 28 of the clamping arms 25 and 26, respectively, fit in recesses in the lugs 23 and 24 and have bushings for receiving bolts 29 and 30 extending through the lugs about axes parallel to the axis about which the brake disc 13 is rotatable.

In close proximity to the upper ends 27 and 28 of the clamping arms 25 and 26, friction members such as brake shoes 33 and 34 are pivotally mounted on pins 35 and 36 within clevis portions 37 and 38 of clamping arms 25 and 26, respectively. The brake shoes 33 and 34 have linings 39 and 40 with concave cylindrical surfaces for mating engagement with a convex cylindrical surface 42 at circular edge 43 of the brake disc 13. As shown in FIG. 1, the circular edge 43 is disposed radially inward from the brake shoes 33 and 34.

The clamping arm 25 extends in a clockwise direction from the pin 35 of the brake shoe 33 to the pivotal connection with the head assembly 18 at bolt 29. The clamping arm 26 extends in a counterclockwise from the pin 36 of the brake shoe 34 to the pivotal connection of the arm with the head assembly 18 at bolts 30. The clamping arms 25 and 26 extend in the other direction to lower ends 44 and 45. Bushings are provided in the lower ends 44 and 45 of arms 25 and 26 for receiving connecting pins 46 and 47 extending through a piston rod yoke 48 and a cylinder yoke 49 of piston and cylinder assembly 52.

Figure 3:
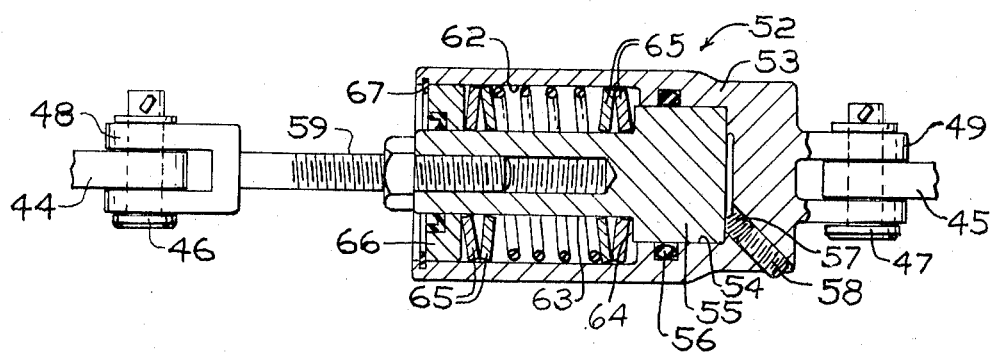
FIG. 3 is a sectional view of the parking brake application and release mechanism taken along the plane of line 3—3 of FIG. 2.

Referring now to FIG. 3, the piston and cylinder assembly 52 has a housing 53 containing a cylinder 54 for receiving a piston 55 in sliding engagement and with the end of the cylinder being sealed by an O-ring 56. A passage 57 in the housing 53 leads from the head end of the cylinder 54 to a nipple 58 threaded in the housing and adapted for receiving a hose or other suitable connection to a source of compressed air or hydraulic fluid for injecting fluid into the cylinder and moving piston 55 away from the head end of the cylinder. The piston 55 is connected to the piston rod yoke 48 by a piston rod 59 so that the movement of the piston away from the head end of the cylinder 54 will separate the lower ends 44 and 45 of the clamping arms 25 and 26 and thereby disengage the brake shoes 33 and 34 and linings 39 and 40 from the circular edge 43 of the brake disc 13.

The housing 53 of the piston and cylinder assembly 52 extends from the cylinder 54 towards the piston rod yoke 48 forming a spring retaining chamber 62 having a greater diameter than the cylinder 54. The piston 55 within the spring retaining chamber 62 has a spring supporting portion 63 of lesser diameter than the portion in cylinder 54 providing a shoulder 64 adjacent the cylinder. A mechanical means such as a compression spring made up of a series of spring washers 65 is disposed around the spring supporting portion 63 of the piston 55 with the spring washers abutting the shoulder 64 at one end of the compression spring. At the other end, a spring retaining washer 66 is mounted in the spring retaining chamber 62 and held in position by a retaining ring 67 set in a groove in the housing 53 and engageable with the outer periphery of the washer 66. The spring washers 65 are assembled in compression, as shown in FIG. 3, so that upon release of the fluid under pressure from the cylinder 54, the piston 55 will be moved into the cylinder bringing the lower ends 44 and 45 of the clamping arms 25 and 26 together and biasing the brake shoes 33 and 34 and linings 39 and 40 into braking engagement with the circular edge 43 of the brake disc 13 to provide an effective parking brake.

In operation, when the vehicle is traveling along the road, the air or hydraulic pressure is communicated to the cylinder 54 holding the piston 55 away from the head end of the cylinder and separating the lower ends 44 and 45 of the arms 25 and 26 and thereby holding the brake shoes 33 and 34 away from the edge 43 of the brake disc 13. When the vehicle is stopped and it is desired to apply the parking brake, the fluid pressure is released from the cylinder 54 permitting the spring washers 65 to expand and move the piston 55 towards the head end of the cylinder causing the lower ends 44 and 45 of the clamping arms 25 and 26 to be brought together and the brake shoes 33 and 34 urged into braking engagement with the circular edge 43 of the brake disc 13.

As shown in FIG. 1, if the wheel 12 tends to rotate in the clockwise direction relative to the head assembly 18, the friction lining 39 will be urged in the clockwise direction increasing the radial force of the lining against the surface 42 of the disc 13 and further preventing rotation of the disc. Likewise, if the wheel 12 is urged in the counterclockwise direction, the lining 40 will be urged in the counterclockwise direction by the disc 13 increasing the radial force of the lining against the disc and further preventing relative rotation of the disc in the parking condition.

When the vehicle is to be moved again, the parking brake may be released by communicating compressed air or hydraulic fluid into the cylinder 54 against the piston 55 overcoming the force of the spring washers 65 and moving the clamping arms 25, 26 apart to release the braking pressure of the shoes 33 and 34 against the brake disc 13.

In the present embodiment, there may be limited relative axial movement of the disc 13 and the head assembly 18 due to normal axial movement of the wheel 12 relative to the axle 11. The operation of the parking brake will not be adversely affected by this movement in that the convex cylindrical surface 42 of the brake disc matches the concave cylindrical surfaces of the linings 39 and 40 so that the relative axial movement is not critical. The parking brake of this application may be used with other types of caliper disc brakes where the circular edge of the disc brake is in a position to be engaged by brake shoes and the pivotally mounted clamping arms may be connected to suitable power and mechanical means to apply and release the brake.

I claim:

1. A parking brake for a caliper brake assembly having a nonrotatable brake head assembly, a rotatable brake disc with an outer circular edge and said brake head assembly extending over said outer circular edge in one sector of the brake assembly, comprising a clamping arm pivotally mounted on and extending away from said brake head assembly, a friction member mounted on said clamping arm and movable with said arm into and out of braking engagement with said outer circular edge of said brake disc in a second sector of the brake assembly, mechanical means connected to said clamping arm for generating a braking force to bias said friction member into braking engagement with said outer circular edge of said brake disc, power means connected to said clamping arm for generating a brake releasing force greater than said braking force of said mechanical means to bias said friction member out of engagement with said outer circular edge of said disc whereby said parking brake is applied by said mechanical means when said power means is released and said parking brake is released when said power means is actuated.

2. A parking brake according to claim 1 wherein said friction member is mounted at a position in close proximity to said pivotal connection to said brake head assembly and between said pivotal connection and the connection of said arm to said mechanical means whereby the pressure applied against said circular edge of said disc by said friction member is increased due to this mechanical advantage.

3. A parking brake according to claim 1 wherein said clamping arm is one of a pair of clamping arms including a first arm pivotally mounted on said brake head assembly at one side of said brake disc and a second arm pivotally mounted on said brake head assembly on the other side of said brake disc, said first arm carrying a first friction member engageable with said outer circular edge in said second sector of said brake assembly at said one side and said second arm carrying a second friction member engageable with said outer circular edge in said second sector at said other side, said mechanical means and said power means being connected to said first arm and said second arm for moving said pair of clamping arms together to bias said first friction member and said second friction member into braking engagement with said outer circular edge and for moving said pair of clamping arms apart to bias said first friction member and said second friction member out of engagement with said outer circular edge.

4. A parking brake according to claim 1 wherein said caliper brake assembly is mounted on a vehicle having a rotatable wheel and a nonrotatable axle, said rotatable brake disc being mounted on said wheel and said brake head assembly being mounted on said axle, said outer circular edge of said brake disc having a convex cylindrical surface and said friction member having a substantially matching concave cylindrical surface for engagement with said outer circular edge of said brake disc whereby braking engagement between said convex cylindrical surface and said concave cylindrical surface is maintained during relative axial displacement of these surfaces resulting from relative axial displacement of said wheel and said axle in operation of the parking brake.

5. A parking brake for a caliper brake assembly having a nonrotatable brake head assembly and a rotatable brake disc with a circular edge comprising a pair of clamping arms including a first arm pivotally mounted on said brake head assembly at one side of said brake disc and a second arm pivotally mounted on said brake head assembly on the other side of the brake disc, said first arm carrying a first friction member engageable with said circular edge at said one side and said second arm carrying a second friction member engageable with said circular edge at said other side, mechanical means being connected to said first arm and said second arm for moving said pair of clamping arms together to bias said first friction member and said second friction member into braking engagement with said circular edge and power means for generating a brake releasing force greater than said braking force of said mechanical means for moving said pair of clamping arms apart to bias said first friction member and said second friction member out of engagement with said circular edge whereby said parking brake is applied by said mechanical means when said power means is released and said parking brake is released when said power means is actuated and said first arm being pivotally connected to said brake head assembly at a position in a clockwise direction from said first friction member and said second arm being pivotally connected to said brake head assembly at a position in a counterclockwise direction from said second friction member whereby the rotation of said brake disc in either the clockwise or counterclockwise direction will interact with said first friction member or said second friction member to increase the braking engagement of said first friction member or said second friction member with said circular edge.

6. A parking brake for a caliper brake assembly having a nonrotatable brake head assembly and a rotatable brake disc with a circular edge comprising a clamping arm pivotally mounted on said brake head assembly, a friction member mounted on said clamping arm and movable with said arm into and out of braking engagement with said circular edge of said brake disc, mechanical means connected to said clamping arm for generating a braking force to bias said friction member into braking engagement with said circular edge of said brake disc, power means connected to said clamping arm for generating a brake releasing force greater than said braking force of said mechanical means to bias said friction member out of engagement with said circular edge of said disc whereby said parking brake is applied by said mechanical means when said power means is released and said parking brake is released when said power means is actuated and said arm being pivotally connected to said brake head assembly at a position spaced from said friction member whereby the rotation of said brake disc in a direction towards the pivotal connection with said brake head assembly will interact with said friction member to increase the braking engagement of said friction member with said circular edge.

* * * * *